United States Patent
Parker et al.

(12)
(10) Patent No.: US 6,658,816 B1
(45) Date of Patent: Dec. 9, 2003

(54) BULK PALLETIZER SYSTEM

(75) Inventors: Jonathan D. Parker, Perrysburg, OH (US); Aaron J. Peper, Toledo, OH (US); Brian D. Macleod, Maumee, OH (US)

(73) Assignee: Kaufman Engineered Systems, Inc., Waterville, OH (US)

( * ) Notice: Subject to any disclaimer, the term of this patent is extended or adjusted under 35 U.S.C. 154(b) by 249 days.

(21) Appl. No.: 09/441,490

(22) Filed: Nov. 17, 1999

(51) Int. Cl.$^7$ .................................................. B65B 11/00
(52) U.S. Cl. ............................. 53/397; 53/447; 53/540; 414/2; 414/5; 414/788.1
(58) Field of Search .......................... 414/2, 5, 788.1, 414/788; 53/397, 399, 447, 540

(56) References Cited

U.S. PATENT DOCUMENTS

| | | | |
|---|---|---|---|
| 4,154,347 A | * | 5/1979 | Vander Meer et al. |
| 4,897,980 A | * | 2/1990 | Geyser et al. |
| 4,915,368 A | * | 4/1990 | Tsunekawa et al. |
| 5,005,335 A | | 4/1991 | Yourgelite et al. |
| 5,046,303 A | * | 9/1991 | Becicka et al. |
| 5,403,056 A | * | 4/1995 | Wallace |
| 5,450,709 A | | 9/1995 | Steding |
| 5,582,287 A | | 12/1996 | Heit et al. |
| 5,701,722 A | | 12/1997 | Franklin et al. |
| 5,716,189 A | | 2/1998 | Winski et al. |
| 5,738,484 A | * | 4/1998 | Taylor |
| 5,857,311 A | * | 1/1999 | Focke et al. |
| 5,957,025 A | * | 9/1999 | Buckmaster et al. |
| 6,082,080 A | * | 7/2000 | Holter et al. |
| 6,142,722 A | * | 11/2000 | Genov et al. |
| 6,178,720 B1 | * | 1/2001 | Schianchi |
| 6,227,787 B1 | * | 5/2001 | Spicher |
| 6,238,173 B1 | * | 5/2001 | Corsini |

* cited by examiner

Primary Examiner—Eugene Kim
(74) Attorney, Agent, or Firm—Emch, Schaffer, Schaub & Porcello Co., L.P.A.

(57) ABSTRACT

This machine is a cell for bulk palletizing a load such as the packaging of containers (bottles). The machine comprises a tier building system, a bulk load and dunnage supply systems. The cell also includes a programmable robot with cantilevered arm including an effector for transferring pallets, tiers of bulk product, tier sheets and top frames to the load build area. The effector includes an inverted drawer, suction means, pallet gripper means and top frame grippers for doing the transferring.

30 Claims, 7 Drawing Sheets

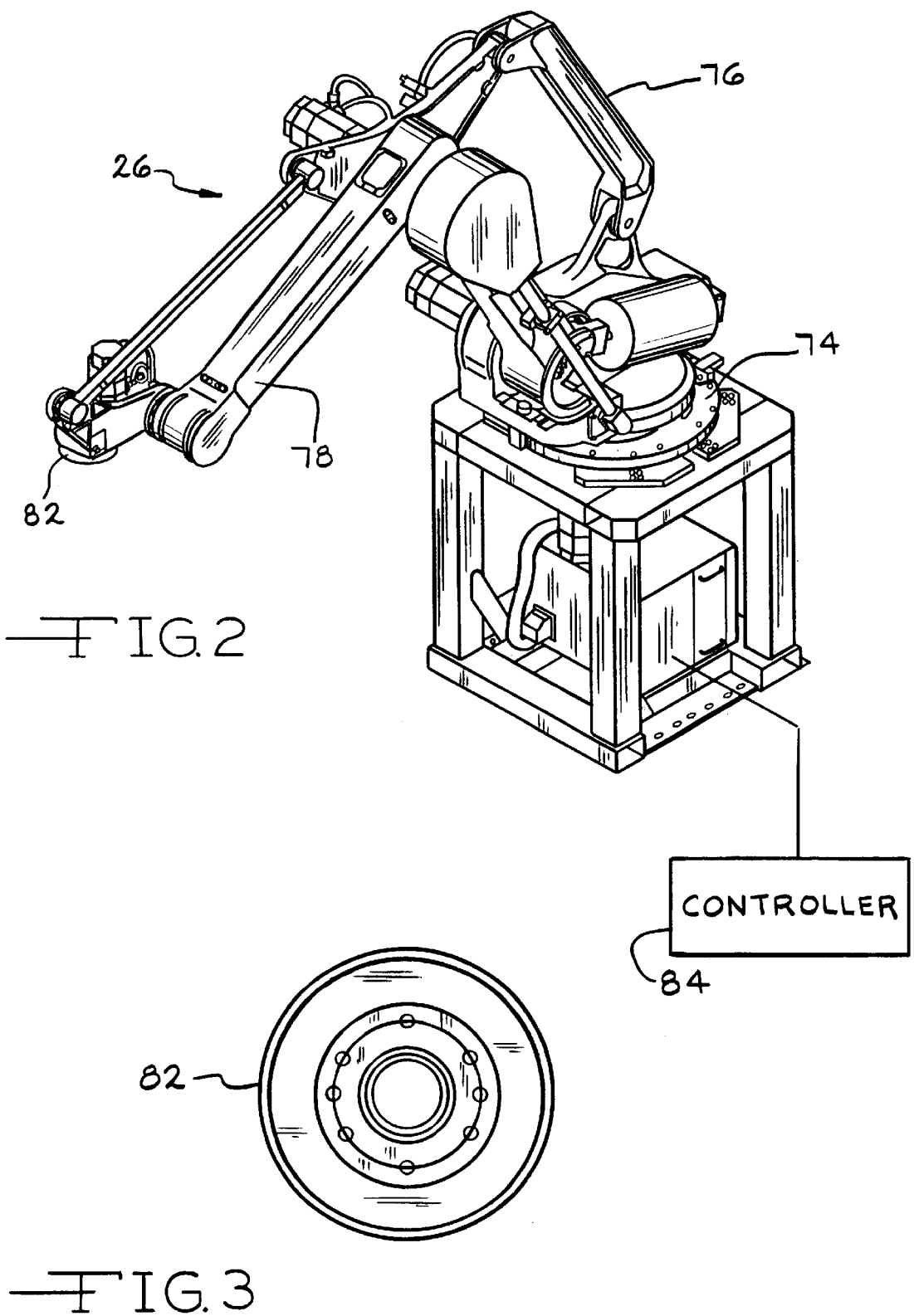

BULK PALLETIZER SYSTEM

TECHNICAL FIELD

This invention relates to a bulk palletizer with a programmable, cantilevered arm. In one embodiment, the invention relates to an innovative end-of-arm tool on the programmable arm.

BACKGROUND ART

In the recent past, customers purchased machines to palletize bulk loads of empty containers that were semi-automatic. These machines required manual placement of tier sheets and top-frames. More recently, fully automatic palletizers were introduced that took the manual placement of tier sheets and top frames to an automatic function of the machine.

These machines use separate, distinct, and large complex mechanical devices to perform the operations of feeding the pallet, feeding the individual slip sheets, feeding the top frame that gives the load strength during the strapping process, and stacking the tiers of containers. There are effectively several machines inefficiently performing the same role as our invention.

The conventional non-robotic bulk palletizer consists of many frames joined together occupying horizontal and vertical space much greater than our invention. Space is cost to a manufacturer.

DISCLOSURE OF INVENTION

Generally, the invention is the cell. The cell is an integration of equipment that will form a tier of containers, stack the tiers of containers, place pallets, tier sheets, and top frames and prepare the load for strapping and removal to the warehouse.

Specifically, this cell for bulk palletizing containers is comprised of a tier staging area, a programmable robot with cantilevered arm and end-of-arm tool, a tier sheet station, a pallet station, a top frame station, and a load build area. The end-of-arm tool incorporates the full tier pickup, tier sheet pickup, pallet pickup, and top frame pickup. The single robot will perform all functions in the sequence.

More specifically, the essence of the invention is the use of a robot to gather the tier of containers and carry it to the load build area for stacking the tiers. The cell uniquely includes a programmable robot with cantilevered arm as a single means for placing pallets, tiers of containers, tier sheets and top frames in the load build area.

In the cell, tier, tier sheets, pallets, and top frames stacks can be automatically delivered to the system on conveyors without a fork truck entering the cell. This cell provides reduced space, a drastic reduction in electrical controls and sensors, and one mechanical component that will perform the multiple operations of stacking the tiers of containers, placing the pallet, tier sheets and top frame. Since this equipment is one piece, fewer moving parts will create less maintenance and less down time. Absolutely unique is the end of arm tooling fitted to the robot that will gather a complete tier and place tiers robotically on the previous tier until a complete load is built.

BRIEF DESCRIPTION OF THE DRAWINGS

FIG. 2 is a perspective view of a programmable multi-axis robot used with this invention.

FIG. 3 shows the mounting plate of the robot of FIG. 2.

BEST MODE OF CARRYING OUT INVENTION

Briefly, the robot will pick up a pallet from the pallet station and place it in the load build area. Then it will pick up a tier sheet from the tier sheet station and place it on top of the pallet. Then the robot will pick up a full tier of bottles from the tier build area and place the bottles on top of the tier sheet in the load build area. This process will be repeated for the number of tiers necessary to complete the load. Finally, the robot will pick up a top frame from the top frame station and place it on the tier sheet on the top of the finished load. The bulk load will then convey to a given point for pickup either manually or automatically.

A dunnage supply line may provide pallets, tier sheets or top frames to the stations.

Figure 1:
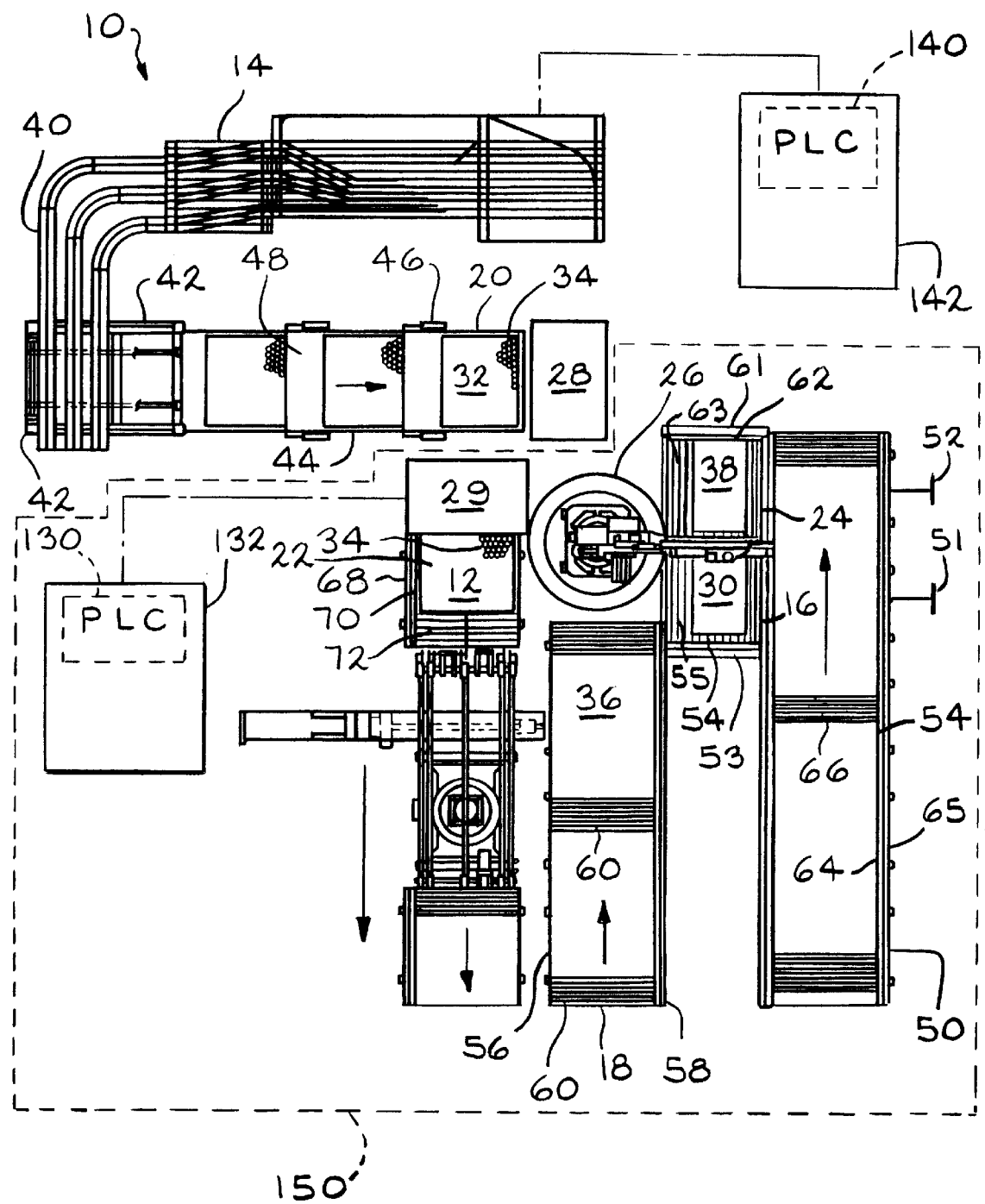
FIG. 1 is a top schematic view showing the cell of this invention.

FIG. 1 shows cell 10 for packaging bulk load 12 comprising bulk product feeder 14, pallet station 16, tier sheet station 18, tier staging area 20, load build area 22, top frame station 24, programmable, articulate, robot 26 and tier pick up area 28. Robot arm 26 is a single means for placing pallets 30, tiers 32 of bulk product 34, tier sheets 36 and top frames 38 in load build area 22. Robot 26 picks up tier 32 at full tier pickup area 28 and discharges it at tier drop off area 29. Pallets, tiers, tier sheets, top frames often are referred to as dunnage.

Bulk product feeder 14 typically comprises a multiplicity of parallel conveyor belts 40 which carry rows of bulk product 34 (bottles). Frame 42 support belts 40. The rows are fed to tier staging area 20. Tier staging area 20 typically include conveyor 44 which comprises frame 46 supporting feed belt 48. Usually tier staging area 20 is at the end of bulk product feeder 14.

Tier sheet station 18 comprises conveyor 56 which includes frame 58 supporting rollers 60. Tier sheet station 18 is perpendicular to pallet station 16 and also parallel to load build area 22. Robot 26 picks up pallet 30 from pallet station 16 and locates it at load build area 22. This is followed sequentially by alternating layers of tier sheet 36 and tier 32. In one embodiment where no pallet 30 is employed, the first layer is tier sheet 36.

The rows of product 34 form tier 32 on conveyor 44. Conveyor 44 then transports tier 32 to tier staging area 20. As will be shown later, tier 32 is located in load build area 22 by robot 26. Dunnage supply line 50 provides pallets 30 to pallet station 16 and top frames 38 to top frame station 24. Line 50 is perpendicular to stations 16 and 24. Pushers such as chain transfers 51 and 52 move pallets 30 and top frames 38 to stations 16 and 24, respectively.

Pallet station 16 comprises conveyor 53 which includes frame 54 supporting a multiplicity of rollers 55. Pallet station 16 usually is perpendicular to load build area 22. Tier sheet station 18 comprises conveyor 56, frame 58 and a multiplicity of rollers 60.

Dunnage line 50 comprises conveyor 64 which includes frame 65 supporting a multiplicity of rollers 66.

Top frame station 24 comprises conveyor 61 which includes frame 62 supporting a multiplicity of rollers 63.

Bulk load conveyor 68 removes bulk load 12 from load building area 22. Conveyor 68 comprises frame 70 and rollers 72. Typically, conveyor 68 transfers bulk load 12 to strapping and storage if necessary.

FIG. 1 also shows control 130, a programmable logic controller (PLC), and a power control panel 132 operate cell 150 through conventional circuitry not shown.

FIG. 1 also shows bulk product PLC 140 and bulk product control panel 142 which operate bulk product feeder 14 through conventional circuitry, not shown.

PLC 130 in control panel 132 controls cell 150 the bulk load and dunnage conveying system. PLC 140 in control panel 142 controls 14 the tier building system. PLC 130 interfaces with controller 84, which controls robot 26. See FIG. 2. PLC 130 also interfaces with PLC 140 and is the main control for cell 10. Power control panels 132 and 142 are wired to their respective drives and sensors and actuators.

FIG. 2 shows robot 26 in greater detail. Robot 26 mounts on main rotary axis 74 and can rotate 360° about axis 74. Robot 26 also includes main support post 76 extending vertically from axis 74. Cantilevered arm 78 extends from post 76 and carries end effector 80. Effector 80 is capable of locating pallets 30, tiers 32, tier sheets 36 and top frames 38 into load building area 22 to build bulk load 12.

A distal end of cantilevered arm 78 carries mounting plate 82. Plate 82 attaches to arm 78 with conventional fasteners and effector 80 attaches to plate 82 with similar mechanical fasteners.

Robot 26 is a programmable multi-axis robot. Programmable logic controller 84 controls robot 26. Typically the multi-axis robot 26 has five axes of motion.

FIG. 3 shows mounting plate 82 in greater detail.

Figure 4:
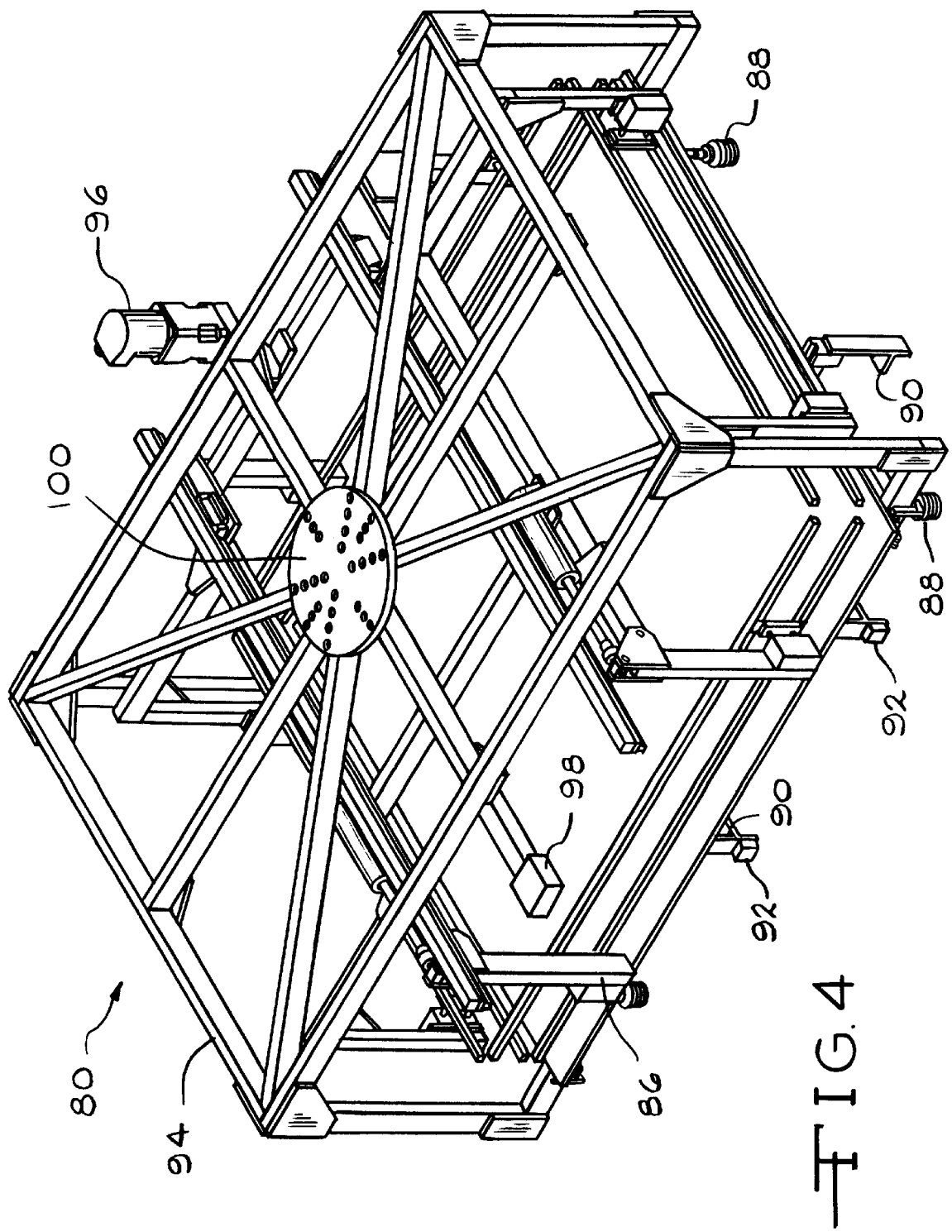
FIG. 4 shows the end effector (pickup) which attaches to the mounting plate of FIG. 3.

FIG. 4 shows end effector 80 in greater detail. Effector 80 includes inverted drawer 86 for securing tier 32 of product 34. Effector 80 also includes suction means 88 for picking up tier sheet 36. Pallet gripper tabs 90 lift pallet 30 from station 16. Top frame grippers 92 grip top frames 38 from station 24. Frame 94 supports the various components of effector 80. Frame 94 also supports drive motor 96 and belt drive 98. Motor 96 and drive 98 operate inverted drawer 86. Effector 80 also includes mounting plate 100. Mounting plate 100 typically is welded to frame 94 and fastened to mounting plate 82 of robot 26.

Figure 5:
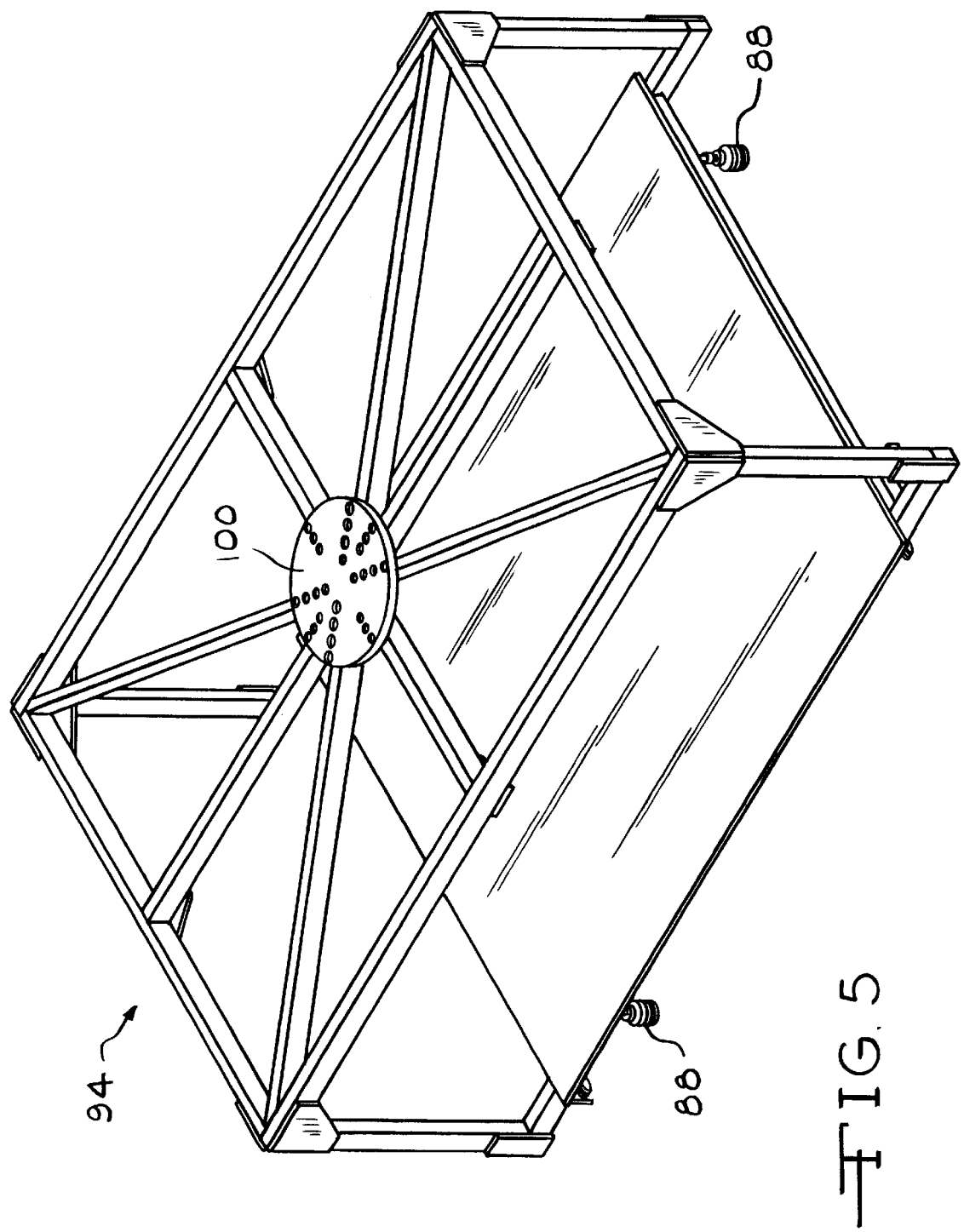
FIG. 5 shows the frame of the end effector and suction means for tier sheet pickup.

FIG. 5 shows frame 94 without inverted drawer 86. This shows the position of suction means 88 in place below frame 94.

Figure 6:
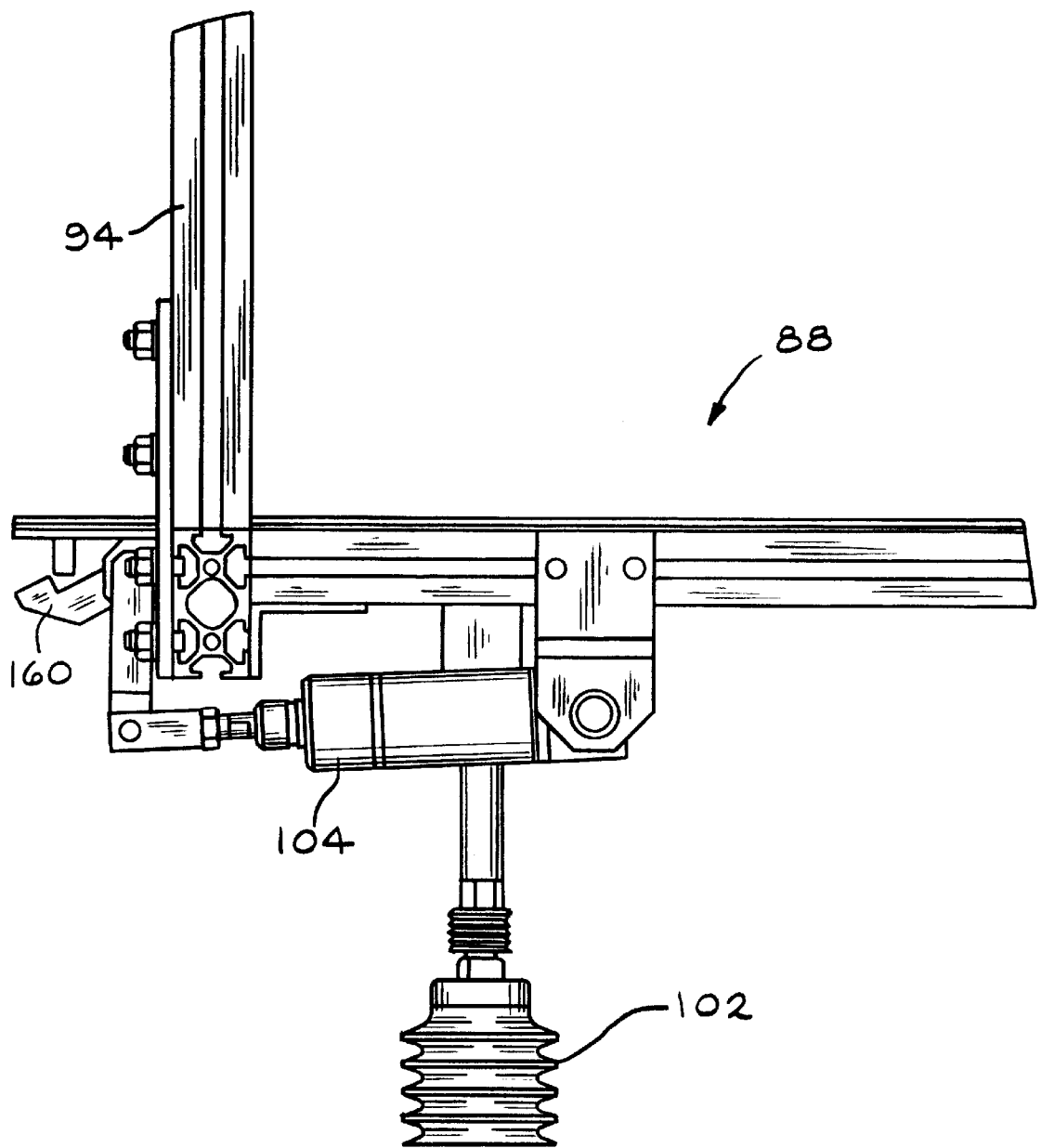
FIG. 6 shows an enlarged view of the suction means.

FIG. 6 shows suction means 88 to include vacuum cups 102. Vacuum cups 102 lift tier sheet 36 from tier sheet station 18 and place it on bulk load 12 in load build area 22. FIG. 6 also shows tier sheet gripper 160 which is actuated by air cylinders 104. Conventional line air pressure from the factory provides the necessary air pressure to generate vacuum pressure to cups 102 and cylinders 104 for lifting tier sheets 36. Tier sheet gripper 160 holds tier sheet 36 in place so it will not slide when tier 32 is being placed on tier sheet 36.

Figure 7:
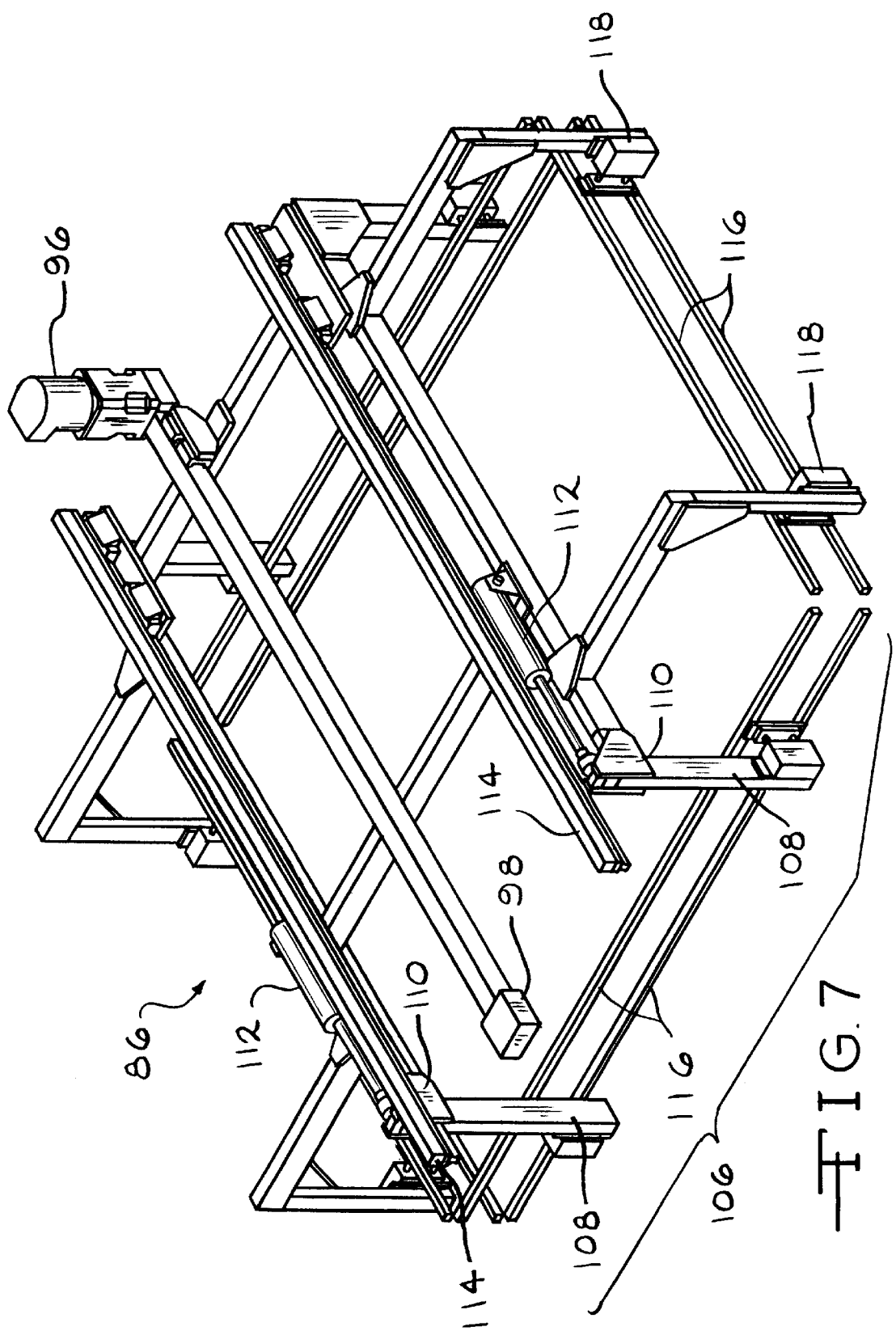
FIG. 7 shows an inverted drawer without the frame for tier (bottles) pickup.

FIG. 7 shows inverted drawer 86 without frame 94. Drawer 86 includes gate 106. Gates 106 connects to invented drawer 86 flip gate arms 108 and hinges 110. Hinges 110 connect to air cylinders 112. Air cylinders 112 open lift gate 106 prior to securing tier 32 of product 34. Motor 96 through drive belt 98 moves inverted drawer 86 forward in a linear direction along linear guide rails 114 until drawer 86 moves tier 32 to the confines of frame 94. Gate 106 comes down and crowders 116 more inwardly to grasp tier 32. Crowders 116 are actuated by air cylinders 118. Crowder 116 pinch tier 32 with sufficient pressure to hold tier 32. Robot 26 then moves tier 32 and places it in load building area 22. Inverted drawer 86 then slides tier 32 into position on bulk load 12. Pressure is released from air cylinders 118 and drawer 86 lifts vertically away leaving tier 32 in place in load building area 22.

Figure 8:
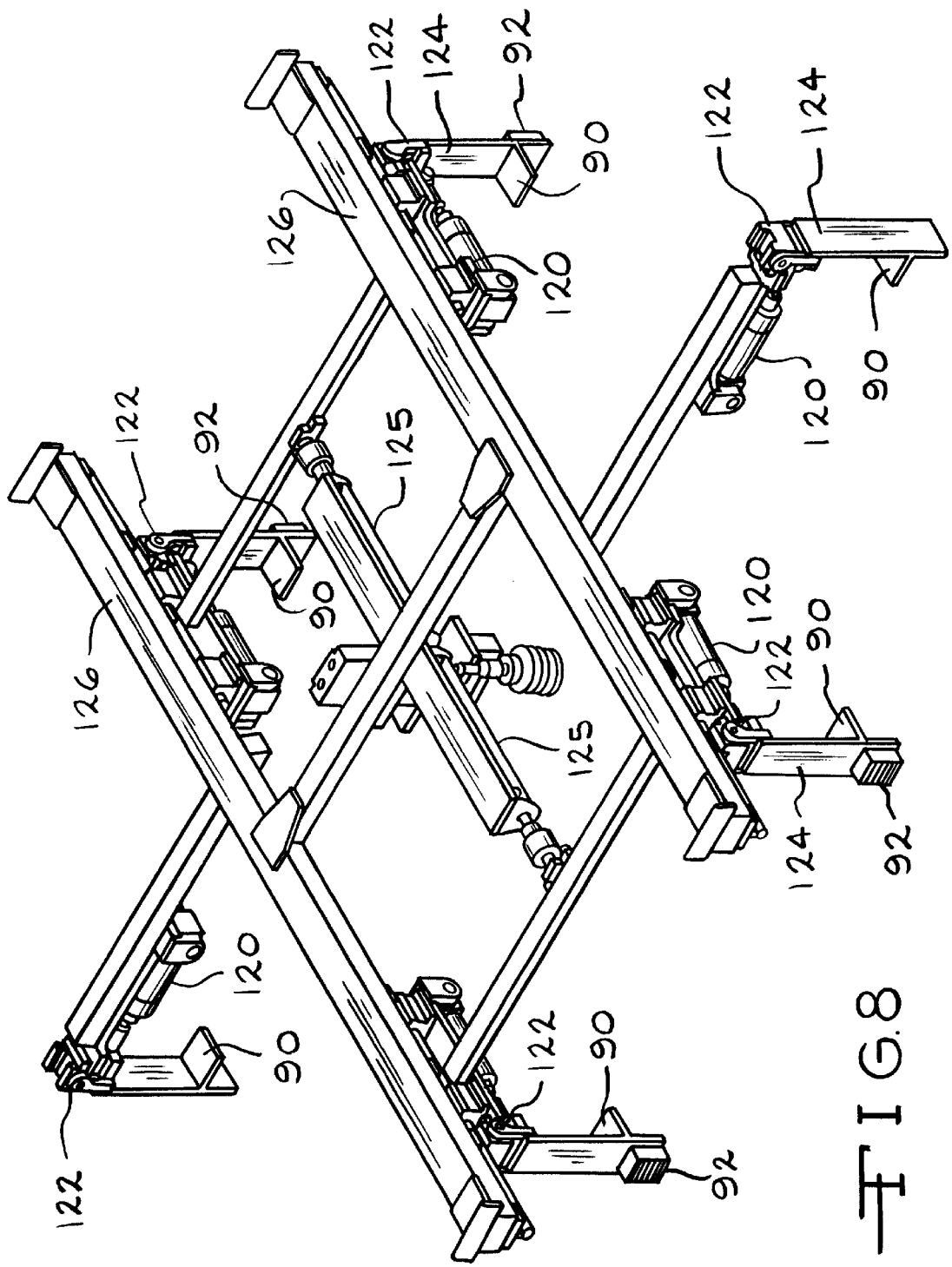
FIG. 8 shows the pallet gripper tabs and top frame grippers of the end effector.

FIG. 8 shows that portion of effector 80 without inverted drawer 86 and without portions of frame 94. This includes pallet gripper tabs 90 and top frame grippers 92. Air cylinders 120 through hinge 122 connect to arm 124 which supports tabs 90 and grippers 92. Guide rails 126 support the system so that tabs 90 and grippers 92 only have linear motion. When transferring pallets 30 from station 16 to load building area 22, tabs 90 engage pallets 30 much like the prongs of a fork lift truck. As a result, tabs 90 lift pallets 30 in a vertical direction. Robotic arm 26 then rotates pallets 30 to area 22. Tabs 90 pivots away from pallets 30 and pallets 30 are left in place in area 22.

When transferring top frame 38 from station 24 to area 22, grippers 92 engage the inside perimeter of frames 38. Air cylinders 125 move grippers 92 outwardly thereby holding the inside perimeter of frame 38. Robotic arm 26 rotates to area 22 and retracts grippers 92 leaving frame 34 in place in area 22.

As a result, we arrange layers of pallets 30, tiers 32, tier sheets 36 and top frame 38 as desired until bulk load 12 is finished.

In addition to the embodiments discussed above, it will be clear to persons skilled in the discipline that numerous modifications and changes can be made to the above invention without departing from its intended spirit and scope.

We claim:

1. An apparatus for bulk palletizing a load comprising:
   a tier building system;
   a pallet station;
   a tier sheet station;
   a load build area;
   a top frame station;
   a dunnage supply line; and
   a programmable robot, including a single means for transferring pallets, tiers of bulk product, tier sheets and top frames to the load build area wherein the programmable, robot includes a microprocessor and software configured to build a bulk load by sequentially feeding a pallet, a tier of bulk product, a tier sheet, a tier of bulk product and a top frame as necessary to the load building area.

2. An apparatus according to claim 1 wherein the microprocessor and software are configured to stack multiple, alternating layers of tiers of product and tier sheets sandwiched between the pallet and the top frame.

3. An apparatus according to claim 1 wherein the single means for transferring is an end effector including an inverted drawer for transferring a tier of bulk product, suction means for transferring a tier sheet, a pallet gripper means for transferring a pallet, top frame grippers for transferring a top frame, a frame for supporting the inverted drawer, the suction means, the pallet gripper means and the top frame grippers wherein the frame of the end effector also is connected to the robotic arm.

4. An apparatus according to claim 1 wherein the programmable robot is a multi-axis robot including a cantilevered arm with a mounting plate integral to a distal end of the arm.

5. An apparatus according to claim 4 wherein the multi-axis robot has five axes of motion.

6. An apparatus according to claim 3 wherein the inverted drawer includes a gate on one side thereof and at least one crowder on each side of the inverted drawer.

7. An apparatus according to claim 3 including at least one linear guide rail allowing the inverted drawer to move back and forth in a linear direction.

8. An apparatus according to claim 6 including a linear guide rail, a means for opening and closing the gate and a means for moving the crowders in a linear direction perpendicular to the linear guide rail.

9. An apparatus according to claim 3 wherein the suction means is at least one suction cup.

10. An apparatus according to claim 3 including a tier sheet gripper actuated by an air cylinder.

11. An apparatus according to claim 3 wherein the pallet gripper means is at least one pallet gripper tab on each side of the effector.

12. An apparatus according to claim 3 wherein the pallet gripper means is a plurality of pallet gripper tabs circumscribing the perimeter of the frame of the effector.

13. An apparatus according to claim 11 including a means for moving the pallet gripper tabs inwardly and outwardly.

14. An apparatus according to claim 11 wherein the means for moving the pallet gripper tabs are air cylinders.

15. An apparatus according to claim 3 wherein the top frame grippers are on opposite sides of the effector.

16. An apparatus according to claim 15 wherein the top frame grippers circumscribes the perimeter of the frame of the effector.

17. An apparatus according to claim 15 including a means for moving the top frame grippers inwardly and outwardly in a linear direction.

18. An apparatus according to claim 3 wherein a common arm supports a pallet gripper means and a top frame gripper.

19. An apparatus according to claim 18 wherein the pallet gripper means face the interior of the effector and top frame grippers face away from the effector.

20. An apparatus according to claim 1 wherein the single means for transferring of the programmable, robotic arm also is a means for transferring a bulk product tier to the load building area.

21. An apparatus according to claim 1 wherein the means for transferring a bulk product tier includes a conveyor for transferring a bulk product tier to the load building area.

22. An apparatus according to claim 1 including a conveyor for moving a bulk product loaded pallet from the load building area to a strapping station.

23. An apparatus according to claim 1 wherein the dunnage supply line provides the pallets to the pallet station and provides the top frames to the top frame station.

24. An apparatus according to claim 23 wherein pushers transfer the pallets and the top frames to their respective stations.

25. An apparatus according to claim 24 wherein the pushers are chain transfers.

26. An apparatus for bulk palletizing containers comprising a tier building area, a programmable robot with cantilevered arm with end-of-arm tool, a tier sheet station, a pallet station, a top frame station, and a finished product discharge line, wherein the end-of-arm tool incorporates the full tier pickup, tier sheet pickup, pallet pickup and top frame pickup and wherein the single robot performs all functions in sequence.

27. An apparatus according to claim 26 wherein the robot is programmed to gather the tier and carry it to a load build area for stacking of the tiers.

28. An apparatus according to claim 26 wherein the programmable robot with cantilevered arm is a single means for transferring the pallets, the tiers of containers, the tier sheets and the top frames to a load build area.

29. A process for bulk palletizing a load comprising the steps of sequentially:

placing a pallet in a load building area;

alternatively placing a tier sheet and a tier of bulk product on the pallet;

stacking alternate layers of the tiers and tier sheets on the pallet in load build area;

stacking a top frame on the load; and carrying out the steps with a single programmable robot including a microprocessor and software configured to build a bulk load by sequentially feeding a pallet, a tier of bulk product, a tier sheet, a tier of bulk product and a top frame as necessary to a load building area.

30. A process according to claim 29 wherein the robot includes a cantilevered arm with an end effector, wherein the end effector carries out the steps of placing and stacking.

* * * * *